(12) United States Patent
Fu et al.

(10) Patent No.: US 12,040,686 B2
(45) Date of Patent: Jul. 16, 2024

(54) UNDERWATER TRANSMISSION DEVICE WITH LEAD SCREW SLIDING BLOCK MECHANISM

(71) Applicant: Shanghai Maritime University, Shanghai (CN)

(72) Inventors: Fengting Fu, Shanghai (CN); Weihu Fu, Shanghai (CN); Zhenzhong Chu, Shanghai (CN); Zhiqiang Li, Shanghai (CN); Da Wang, Shanghai (CN); Fulun Wang, Shanghai (CN)

( * ) Notice: Subject to any disclaimer, the term of this patent is extended or adjusted under 35 U.S.C. 154(b) by 252 days.

(21) Appl. No.: 17/777,318

(22) PCT Filed: May 27, 2020

(86) PCT No.: PCT/CN2020/092481
§ 371 (c)(1),
(2) Date: May 17, 2022

(87) PCT Pub. No.: WO2021/098178
PCT Pub. Date: May 27, 2021

(65) Prior Publication Data
US 2022/0407385 A1 Dec. 22, 2022

(30) Foreign Application Priority Data
Nov. 18, 2019 (CN) .......................... 201911126121.X

(51) Int. Cl.
*H02K 7/116* (2006.01)
(52) U.S. Cl.
CPC .................................... *H02K 7/116* (2013.01)
(58) Field of Classification Search
CPC ....................................................... H02K 7/116
See application file for complete search history.

(56) References Cited

U.S. PATENT DOCUMENTS

| | | | | |
|---|---|---|---|---|
| 7,147,203 | B2* | 12/2006 | Terrell | F16K 39/024 137/625.33 |
| 2008/0053962 | A1* | 3/2008 | Cooper | B23Q 7/04 219/69.12 |
| 2010/0072123 | A1* | 3/2010 | Haslem | G01D 5/145 210/232 |

FOREIGN PATENT DOCUMENTS

CN 204568041 U * 8/2015
CN 108674613 A * 10/2018 ............. B63C 11/52

OTHER PUBLICATIONS

Hao (CN 108674613 A) English Translation (Year: 2018).*
Geng (CN 204568041 U) English Translation (Year: 2015).*

* cited by examiner

*Primary Examiner* — Tulsidas C Patel
*Assistant Examiner* — Robert E Mates
(74) *Attorney, Agent, or Firm* — Lei Jiang

(57) ABSTRACT

The present invention discloses an underwater transmission device with a lead screw sliding block mechanism, and relates to the technical field of underwater transmission devices. The device comprises a watertight motor and a lead screw sliding block mechanism A detection device is arranged in the watertight motor and comprises a planetary reducer and a rotary transformer. The lead screw sliding block mechanism comprise a base, a lead screw threaded rod and a sliding block. The watertight motor and the lead screw sliding block mechanism of the underwater transmission device with a lead screw sliding block mechanism are integrally designed. Therefore, the device has a compact structure. The rotary transformer can detect the absolute position of the sliding block, and facilitates debugging of the control system of the watertight motor. An instrument device can be fixed to the sliding block to accurately and linearly reciprocate.

1 Claim, 3 Drawing Sheets

UNDERWATER TRANSMISSION DEVICE WITH LEAD SCREW SLIDING BLOCK MECHANISM

CROSS-REFERENCE TO RELATED APPLICATIONS

The subject application is a continuation-in-part of PCT/CN2020/092481 filed on May 27, 2020, which claims priority on Chinese patent application 201911126121.X filed on Nov. 18, 2019 in China. The contents and subject matter of the PCT international application and Chinese priority application are incorporated herein by reference.

TECHNICAL FIELD

The present invention relates to the technical field of underwater transmission device, in particular to an underwater transmission device with a lead screw sliding block mechanism.

BACKGROUND TECHNIQUE

An underwater transmission device with a lead screw sliding block mechanisms employed to realize the linear reciprocating motion of the underwater instruments and equipment installed on it. Most of the existing devices adopt the split design, that is, a watertight motor and a lead screw sliding block mechanism are designed separately. The size is large, and the absolute position of the sliding block cannot be fed back, so the design of the control system become more complex. Further, in case the control system crashes, the absolute position of the sliding block is lost, and it becomes imperative to find the zero position anew.

SUMMARY OF THE INVENTION

In view of the above problems, the purpose of the present invention is to provide an underwater transmission device with a lead screw sliding block mechanism. The watertight motor and the transmission mechanism are integrated, to become a compact structure, and the device can feed-back the absolute position of the sliding block and is easy to control.

The purpose of present invention is realized through the following technical solutions.

The underwater transmission device with a lead screw sliding block mechanism comprises the watertight motor and the lead screw sliding block mechanism. An output shaft of the watertight motor drives the lead screw slider mechanism. A detection device is arranged in the watertight motor, and the detection device comprises a planetary reducer and a rotating transformer inside a harmonic reducer. The detection device is used to detect the absolute position of the lead screw sliding block mechanism and send the value of the absolute position to a control system of the watertight motor. The lead screw sliding block mechanism comprises a base, a screw threaded rod and a sliding block. The base is provided with three guide rails, and the sliding block is arranged on the screw threaded rod. The three guide rails run through the sliding block.

One end of the planetary reducer is connected with a sealing shell via a dead plate, and the shell of the rotating transformer is arranged on the dead plate distant from the end of the planetary reducer.

The watertight motor comprises the sealing shell, a driving motor and the harmonic reducer.

One end of an output shaft runs through the sealing shell and is connected to the lead screw sliding block mechanism. Multiple sealing rings are arranged between the output shaft and the sealing shell.

The driving motor and the harmonic reducer are arranged in the sealing shell. An output end of the driving motor is connected to the input end of the harmonic reducer. An output end of the harmonic reducer is connected to the output shaft. The planetary reducer is arranged within the harmonic reducer.

The sealing shell comprises a shell, a back end cover, and a front end cover. The front end cover and the back end cover are respectively arranged at both ends of the shell. The front end cover, the shell and the back end cover form a closed cavity.

The driving motor comprises a driving motor stator and a driving motor rotor. The driving motor stator is bonded to the shell, and the driving motor rotor is bonded to the input shaft of the harmonic reducer. The harmonic reducer is connected to the shell via multiple first screws.

The output shaft is supported by a rolling bearing, which is arranged on the harmonic reducer.

The control system of the watertight motor comprises a control board and a watertight connector. The driving motor and the rotating transformer are both electrically connected with the control board, and the control board is connected to the watertight connector.

The base comprises a head base and a tail base. Three identical guide rails arranged in a shape of a triangle are provided between the head base and the tail base. The watertight motor sinks into the head base close to one end of the output shaft.

A lead screw nut is arranged inside the sliding block, and the lead screw nut is threaded on the screw threaded rod. Both ends of the screw threaded rod are installed with a driving shaft and a driven shaft. The driving shaft is connected with the output shaft, and the driven shaft is connected with the tail base.

An angular contact ball bearing is arranged between the driving shaft and the head base, and a double-row angular contact ball bearing is arranged between the driven shaft and the tail base.

Due to the adoption of the above technology, the present invention has the following obvious advantages compared with the existing technology.

The watertight motor and the lead screw sliding block mechanism of the underwater transmission device with a lead screw sliding block mechanism of the present invention adopt integrated design to become a compact structure.

While one end of the output shaft of the underwater transmission device with a lead screw sliding block mechanism of the present invention is connected with a lead screw sliding block mechanism, the other end of the output shaft is connected with the rotating transformer via the planetary reducer. So that the rotating transformer can detect the absolute position of the lead screw sliding block mechanism, which is convenient for debugging of the control system of the watertight motor.

The present invention is suitable for underwater engineering. The instrument device can be fixed on the sliding block to accurately reciprocate in a straight line.

Figure 1:
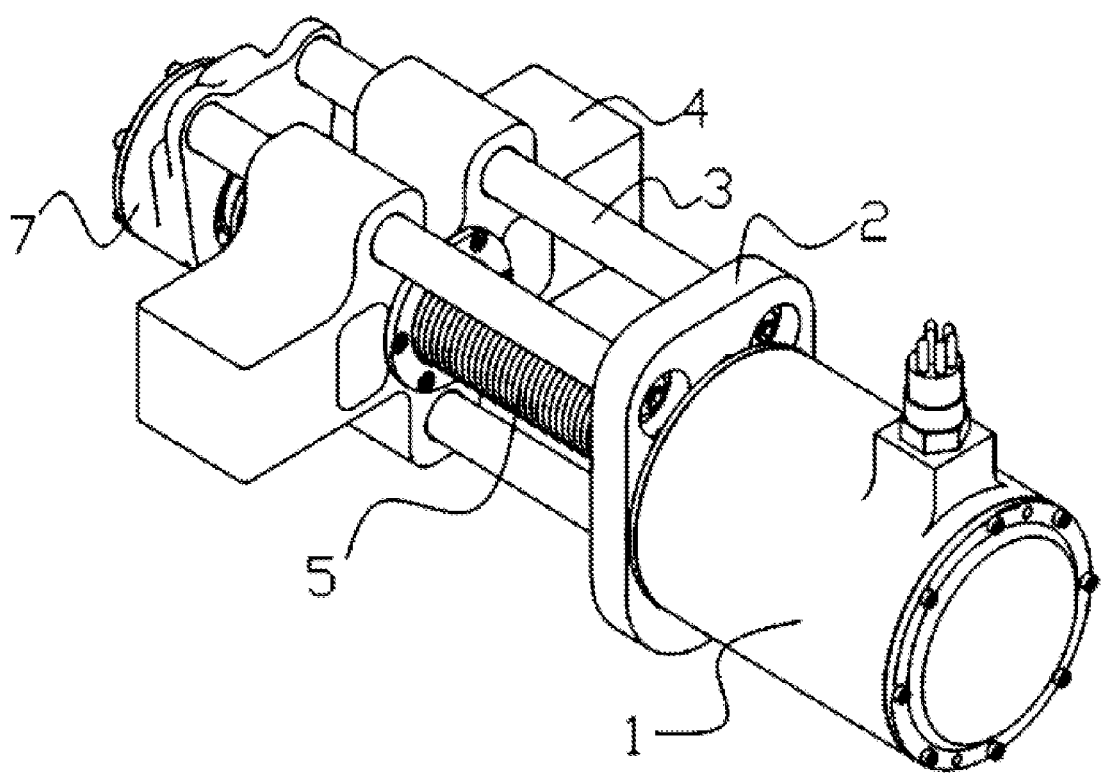
FIG. 1 is a schematic structural diagram of the underwater transmission device with a lead screw sliding block mechanism of the present invention.

Reference signs of the appended drawings are as follows: 1 for watertight motor, 2 for head base, 3 for guide rail, 4 for sliding block, for screw threaded rod, 6 for end cover, 7 for tail base; 8 for double-row angular contact ball bearing, 9 for driven shaft, 10 for lead screw nut, 11 for fourth screw, 12 for third screw, 13 for flat key, 14 for angular contact ball bearing, 15 for fifth screw; 16 for driving shaft, 17 for output shaft, 18 for ring, 19 for second screw, 21 for front end cover, 22 for harmonic reducer, 23 for shell, 24 for driving motor stator, 25 for watertight connector; 26 for back end cover, 27 for control board, 28 for rotating transformer, 29 for planetary reducer, 30 for input sun gear, 31 for rolling bearing; 32 for first sealing ring, 33 for second sealing ring, 34 for driving motor rotor, 35 for first screw, 36 for dead plate

DETAILED DESCRIPTION

The technical scheme in the embodiments of the present invention will be described clearly and completely in combination with the appended drawings and the embodiments of the present invention. Obviously, the described embodiments are only part of the embodiments of the present invention, but not all of them. Based on the embodiments of the present invention, all other embodiments obtained by ordinary technicians in the field without making creative labor should belong to the protection scope of the present invention.

The embodiment of the present invention provides an underwater transmission device with a lead screw sliding block mechanism, which comprises a watertight motor 1 and a lead screw sliding block mechanism. The output shaft 17 of the watertight motor drives the lead sliding block mechanism.

The watertight motor 1 is provided with a detection device, which comprises a planetary reducer 29 and a rotating transformer 28. An input sun gear 30 is arranged on the planetary reducer 29. The input sun gear 30 of the planetary reducer 29 is connected to one end of the output shaft 17 distant from the lead screw sliding block mechanism, and the output shaft of the planetary reducer 29 is connected to the rotating transformer 28. The rotating transformer 28 is connected to the control system of the watertight motor 1. The rotating transformer 28 can detect the absolute position of a lead screw sliding block mechanism, which is convenient for debugging of the control system of the watertight motor 1.

Figure 2:
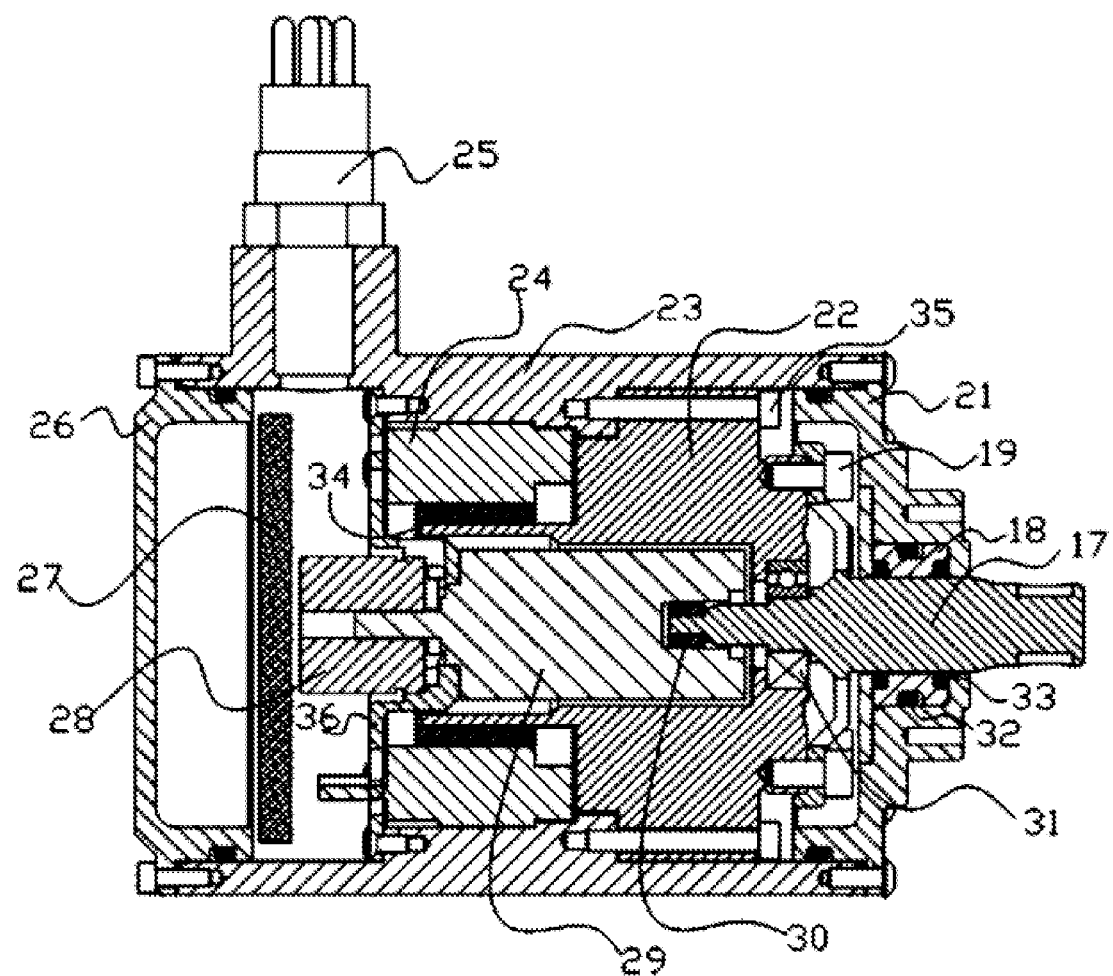
FIG. 2 is a schematic structural diagram of the watertight motor of the underwater transmission device with a lead screw sliding block mechanism of the present invention.

Further, as shown in FIG. 2, the watertight motor 1 comprises a sealing shell, a driving motor, and a harmonic reducer 22. The sealing shell comprises a shell 23, a back end cover 26, and a front end cover 21. The front end cover 21 and the back end cover 26 are respectively arranged at both ends of the shell 23, and the front end cover 21, the shell 23 and the back end cover 26 form a closed cavity. The output shaft 17 is arranged in the cavity. One end of the output shaft 17 which is of an umbrella structure runs through the front end cover 21 and is connected to the lead screw sliding block mechanism. The ring 18 is arranged between the output shaft 17 and the front end cover 21. The front end cover 21 and the ring 18 are sealed together via a first sealing ring 32, and the output shaft 17 and the ring 18 are sealed together via two second sealing rings 33. The driving motor and the harmonic reducer 22 are arranged in the cavity. The driving motor comprises a driving motor stator 24 and a driving motor rotor 34. The driving motor stator 24 is bonded to the shell 23. The driving motor rotor 34 is bonded to the input shaft of the harmonic reducer 22. The harmonic reducer 22 is connected to the shell 23 via multiple first screws 35. The output end of the harmonic reducer 22 is connected to the output shaft 17 via multiple second screws 19. The planetary reducer 29 is arranged within the harmonic reducer 22. The output shaft 17 is supported on the end close to the planetary reducer 29 by a rolling bearing 31, which is arranged on the harmonic reducer 22.

One end of the planetary reducer 29 is connected with the sealing shell 23 via a dead plate 36. The shell of the rotating transformer 28 is arranged on the dead plate 36 distant from the end of the planetary reducer 29.

The control system of the watertight motor 1 comprises a control board 27 and a watertight connector 25. The control board 27 integrates motor driving, rotating transformer decoding, motor angle closed-loop control and other functions. The driving motor 24 and the rotating transformer 28 are both electrically connected with the control board 27. The control board 27 controls the output of the driving motor. A power supply circuit and communication circuit of the control board 27 is connected to the watertight connector 25.

Figure 3:
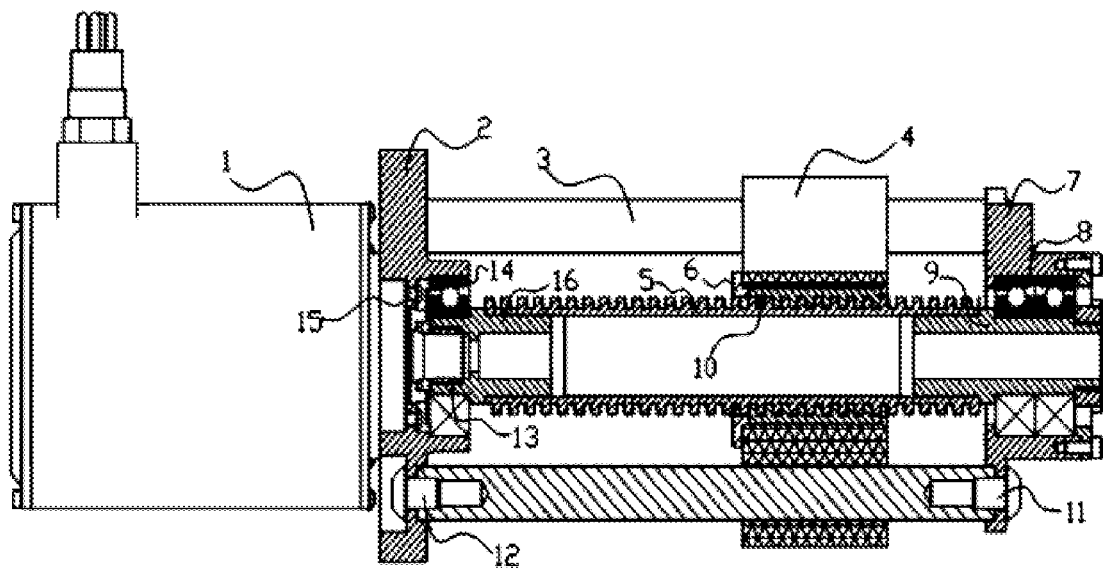
FIG. 3 is a schematic structural diagram of the lead screw sliding block mechanism of the underwater transmission device with a lead screw sliding block mechanism of the present invention.

Further, as shown in FIG. 3, the lead screw sliding block mechanism comprise a base and the lead screw sliding block. The base comprises a head base 2 and a tail base 7. Three identical guide rails 3 is arranged in the shape of triangle are provided between the head base 2 and the tail base 7. One end of each guide rail 3 is connected to the head base 2 via multiple third screws 12, and the other end of each guide rail 3 is connected to the tail base 7 via multiple fourth screws 11. The front end cover 21 sinks into the head base 2 and is connected to the head base 2 via multiple fifth screws 15. The watertight motor 1 and the lead screw sliding block mechanism adopt integrated design to become a compact structure.

The lead screw sliding block mechanism comprises a screw threaded rod 5, a sliding block 4 and a lead screw nut 10. The lead screw nut 10 is arranged inside the sliding block 4 and compressed via an end cover 6. The sliding block 4 is provided with three guide holes. The three guide holes are sleeved on the three guide rails 3 respectively to make the sliding block 4 reciprocate in a straight line along the guide rails 3. The lead screw nut 10 is sleeved on the screw threaded rod 5. Both ends of the screw threaded rod 5 which is of hollow structure to reduce weight are arranged with a driving shaft 16 and a driven shaft 9. The driving shaft 16 and the driven shaft 9 are connected to the screw threaded rod 5 via interference fit. The driving shaft 16 is connected to the output shaft 17 via two flat keys 13. The driven shaft 9 is connected to the tail base 7. The radial and axial direction of the driving shaft 16 are supported by an angular contact ball bearing 14 installed on the head base 2. The radial and axial direction of the driven shaft 9 is supported by a double-row angular contact ball bearing 8 installed on the tail base 7. The output shaft 17 drives the screw threaded rod 5 via the driving shaft 16, and then drives the sliding block 4 to reciprocate in a straight line along the guide rails 3.

The working principle of the present invention is as follows. The driving shaft 16 rotates driven by the output shaft 17 and drives the screw threaded rod 5 to rotate at the same time. The sliding block 4 makes a reciprocating in a straight line on the screw threaded rod 5 via the lead screw nut 10. The rotating transformer 28 feeds back the absolute position angle of 0 to 360 degrees. If the sliding block 4 moves from one end of the screw threaded rod 5 to the other end, the screw threaded rod 5 rotates for a total of 40 turns. When the reduction ratio of the planetary reducer 29 is set to 40:1, if the sliding block 4 moves from one end of the screw threaded rod 5 to the other end, an output end of the planetary reducer 29 rotates exactly one turn. The absolute position of the sliding block 4 on the screw threaded rod 5 corresponds to the angle of the output end of the planetary reducer 29. The rotating transformer 28 is connected to the output end of the planetary reducer 29. The absolute position of the sliding block 4 on the screw threaded rod 5 is accurately obtained via the angle of the output end of the planetary reducer 29. The absolute position of the sliding block 4 is sent to the control system of the watertight motor 1, which can control the rotation of the driving motor for debugging.

From what has been discussed above, the underwater transmission device with a lead screw sliding block mechanism of the present invention adopts integrated design to become a compact structure. While one end of the output shaft 17 of the watertight motor 1 is connected with a lead screw sliding block mechanism, the other end of the output shaft 17 is connected with the rotating transformer 28 via the planetary reducer 29. So that the rotating transformer 28 can detect the absolute position of the sliding block 4, which is convenient for debugging of the control system of the watertight motor 1. The present invention is suitable for underwater engineering, and the instrument device can be fixed on the sliding block 4 to accurately reciprocate in a straight line.

Each embodiment in the description is described in a progressive manner. Each embodiment focuses on the differences from other embodiments. The similar parts of each embodiment can be referred to each other.

The above description of the disclosed embodiments enables the technician in the field to realize or use the present invention. A variety of modifications to these embodiments will be apparent to the technician in the field, and the general principles defined herein can be implemented in other embodiments without departing from the scope of the present invention. Therefore, the present invention will not be limited to these embodiments disclosed herein, but will conform to the widest range consistent with the principles disclosed herein.

The invention claimed is:

1. An underwater transmission device with a lead screw sliding block mechanism, comprising a watertight motor (1) and a lead screw sliding block mechanism, wherein:

the watertight motor (1) is provided with a detection device to detect an absolute position of a sliding block (4) on a screw threaded rod (5) and to send a value of the absolute position to a control system of the watertight motor (1);

the detection device comprises a planetary reducer (29) and a rotating transformer (28), one end of the planetary reducer (29) is connected to the rotating transformer (28), the planetary reducer (29) is connected with a shell (23) via a dead plate (36), the rotating transformer (28) is arranged on the dead plate (36), and the rotating transformer (28) is connected to the control system of the watertight motor (1);

an input sun gear (30) is arranged on the planetary reducer (29), the input sun gear (30) is connected to one end of an output shaft (17) distant from the lead screw sliding block mechanism;

the planetary reducer (29) is arranged within a harmonic reducer (22), the harmonic reducer (22) is connected to the shell (23) via multiple first screws (35), an output end of the harmonic reducer (22) is connected to the output shaft (17) via multiple second screws (19), the output shaft (17) is supported on an end close to the planetary reducer (29) by a rolling bearing (31), the rolling bearing (31) is arranged on the harmonic reducer (22);

a front end cover (21) and a ring (18) are sealed together via a first sealing ring (32), and the output shaft (17) and the ring (18) are sealed together via two second sealing rings (33);

the watertight motor comprises a driving motor stator (24) and a driving motor rotor (34), the driving motor stator (24) is bonded to the shell (23), the driving motor rotor (34) is bonded to an input shaft of the harmonic reducer (22);

the lead screw sliding block mechanism comprises a base, the screw threaded rod (5) and the sliding block (4);

the base comprises a head base (2) and a tail base (7); three identical guide rails (3) are arranged between the head base (2) and the tail base (7); three identical guide rails (3) are arranged in a shape of a triangle and run through the sliding block (4);

the sliding block (4) is arranged on the screw threaded rod (5); a lead screw nut (10) is arranged inside the sliding block (4), the lead screw nut (10) is threaded on the screw threaded rod (5), one end of the screw threaded rod (5) is connected with a driving shaft (16) while another end of the screw threaded rod (5) is connected with a driven shaft (9);

the driving shaft (16) is connected with the output shaft (17), and the driven shaft (9) is connected with the tail base (7); an angular contact ball bearing (14) is arranged between the driving shaft (16) and the head base (2), and a double-row angular contact ball bearing (8) is arranged between the driven shaft (9) and the tail base (7).

* * * * *